United States Patent [19]

Ashworth et al.

[11] Patent Number: 4,566,161
[45] Date of Patent: Jan. 28, 1986

[54] BUCKLES FOR VEHICLE SEAT BELT SYSTEM

[75] Inventors: Roger A. Ashworth, Thursby; Brian E. Aiston, Wigton; John D. Temple, Carlisle, all of England

[73] Assignee: ASE (UK) Limited, Carlisle, England

[21] Appl. No.: 327,592

[22] Filed: Dec. 4, 1981

Related U.S. Application Data

[63] Continuation of Ser. No. 67,521, Aug. 17, 1979.

[30] Foreign Application Priority Data

Aug. 17, 1978 [GB] United Kingdom ............... 33743/78

[51] Int. Cl.[4] ............................................. A44B 11/26
[52] U.S. Cl. ...................................... 24/642; 24/639; 24/641; 24/645
[58] Field of Search ................ 24/642, 641, 639, 645, 24/653, 655, 656, 640, 643, 644, 646, 637

[56] References Cited

U.S. PATENT DOCUMENTS

| | | | |
|---|---|---|---|
| 4,000,548 | 1/1977 | Stephenson et al. | 24/639 |
| 4,094,046 | 6/1978 | Takada | 24/642 |
| 4,100,657 | 7/1978 | Minolla | 24/642 |
| 4,136,425 | 1/1979 | Esner | 24/641 |
| 4,171,557 | 10/1979 | Ennerdal et al. | 24/642 |
| 4,182,008 | 1/1980 | Pouget | 24/645 |
| 4,197,619 | 4/1980 | Burleigh | 24/642 |
| 4,206,533 | 6/1980 | Meiller et al. | 24/642 |

FOREIGN PATENT DOCUMENTS

| | | |
|---|---|---|
| 2263955 | 7/1974 | Fed. Rep. of Germany ........ 24/641 |
| 2326945 | 5/1977 | Fed. Rep. of Germany ........ 24/641 |
| 2752091 | 6/1978 | Fed. Rep. of Germany . |
| 2385350 | 10/1978 | France . |
| 393743 | 8/1976 | Sweden . |
| 483783 | 4/1938 | United Kingdom . |
| 1338861 | 11/1943 | United Kingdom . |
| 1212538 | 1/1970 | United Kingdom . |
| 1388504 | 3/1975 | United Kingdom . |
| 1403820 | 8/1975 | United Kingdom . |
| 1418440 | 12/1975 | United Kingdom . |

*Primary Examiner*—Victor N. Sakran
*Attorney, Agent, or Firm*—Young & Thompson

[57] ABSTRACT

A vehicle seat belt buckle has a flat tongue part with latching edges, and a socket part with spaced parallel plates defining a socket within which the tongue can be received. A latch member slides at right angles to the plane of the tongue to engage the latch formations to retain the tongue within the socket, the movement being imparted by latch member portions received in grooves of a push botton slidably guided for manual movement in the direction of insertion of the tongue. A spring urged detent retains the push button and thus the latch member in the release positions and is itself released by a portion of an ejector device when this is moved inwardly in the socket on insertion of the tongue. In a modification a spring biassed ejector prevents return of the latch member to its latching position after release of the tongue. Instead, an anti-latching member outside the socket can prevent return of the latch member and be withdrawn from engagement with the latch member by an ejector when the tongue is inserted after some initial ejector movement.

39 Claims, 10 Drawing Figures

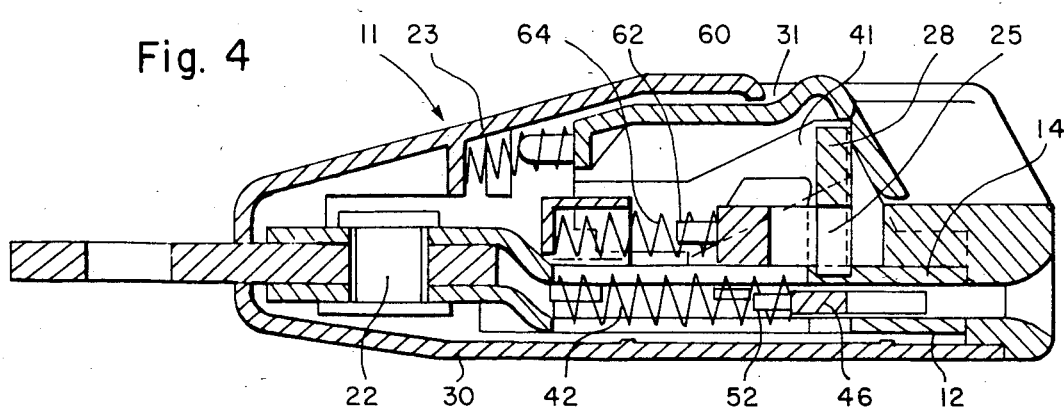

BUCKLES FOR VEHICLE SEAT BELT SYSTEM

This application is a continuation of application Ser. No. 067,521, filed Aug. 17, 1979.

BACKGROUND OF THE INVENTION

The invention relates to buckles of a kind suitable for use in a vehicle seat belt system.

Such buckles conventionally comprise a tongue part and a socket part, the tongue part having a tongue with a latch formation, and the socket part having a socket within which the tongue can be releasably latched by a latch mehcanism having a latch member engageable with the lach formation.

Buckles of this kind require the tongue, on insertion into the socket, to engage the latch member to move this out of the path of the tongue to a position from which the latch member returns under spring pressure to latch the tongue in place; the tongue consequently experiences considerable resistance to insertion, and undesirable lateral loading. In some instances therefore the latch members engage the tongue so as to oppose withdrawal with only limited strength. The latch members can in some instances be displayed to release the tongue by inertial forces experienced when the buckle undergoes a sharp deceleration, as during an accident.

It is accordingly an object of the invention to provide a tongue and socket buckle in which the socket latch member is retained in a non-latching position when the tongue is absent from the socket.

It is a further object of the invention to provide a tongue and socket buckle in which the socket latch member is held in the non-latching position in the absence of the tongue from the socket by a catch means releasable by an ejector mechanism spring biassed to eject the tongue from the socket.

It is additionally an object of the invention to provide a tongue and socket buckle with a manually operable release button which is held in the release position after operation and until the tongue re-enters the socket.

It is also an object of the invention to provide a tongue and socket buckle in which insertion of the tongue into the socket is resisted only by an ejector spring for facilitating removal of the tongue on release of the buckle.

It is a further object of the invention to provide a tongue and socket buckle in which the power needed to move the latch member to the locking position on insertion of the tongue is obtained from the previous release of the tongue from the socket.

It is another object of the invention to provide a buckle in which the latch member moves to the latching position transversely of the direction of movement of the tongue to span the socket in which the tongue is received and is supported externally of the socket against withdrawal forces acting on the tongue by means spaced from the socket.

SUMMARY OF THE INVENTION

The invention provides a vehicle seat belt buckle with a tongue receivable in a socket for retention therein by a lach member, the buckle having catch means adapted to hold the latch member in a non-latching position on withdrawal on the tongue from the socket, the catch means being operable to return the latch member to a latching position on re-entry of the tongue to the socket.

The latch member can be released by pressure against a spring bias on a push button connected to the latch member by a pin and guide slot arrangement, the button being retained in its release position by the catch means which is acted upon by a spring loaded ejector mechanism to release the button and the latch member when the tongue is pushed into the socket to engage the ejector mechanism.

Instead, the catch means can comprise an anti-latching member spring biassed to prevent return of the latch member to the latching position after release of the tongue as by blocking the aperture through which the latch member re-enters the socket. The member can then function as an ejector but can instead be interposed between the socket and a portion of the latch member external thereto. An ejector is then arranged to withdraw the member on insertion of the tongue, so the latch member can move to the latching position under a bias, preferably after a certain amount of initial movement by the tongue.

The latch member can be movable between latching and release positions in a direction transverse, and preferably at right angles, to the direction of movement of the tongue into and out of the socket. Guide means, conveniently roller means, located externally of the socket, can maintain the latch member at right angles to structural means defining the socket.

Other objects, features and advantages of the present invention will be apparent to those skilled in the art from the following detailed description of illustrative embodiments thereof, taken in conjunction with the accompanying drawings, in which:

FIG. 4 is a sectional side view of a second buckle embodying the invention, shown in the absence of the tongue part from the socket part;

FIGS. 5A and 5B are respectively plan and side views of an ejector included in the buckle of FIG. 4;

FIGS. 6A and 6B are respectively plan and front views of an anti-latching member of the buckle of FIG. 4;

FIG. 7 is a side view of a lower plate included in the buckle of FIG. 4; and

Figure 1:
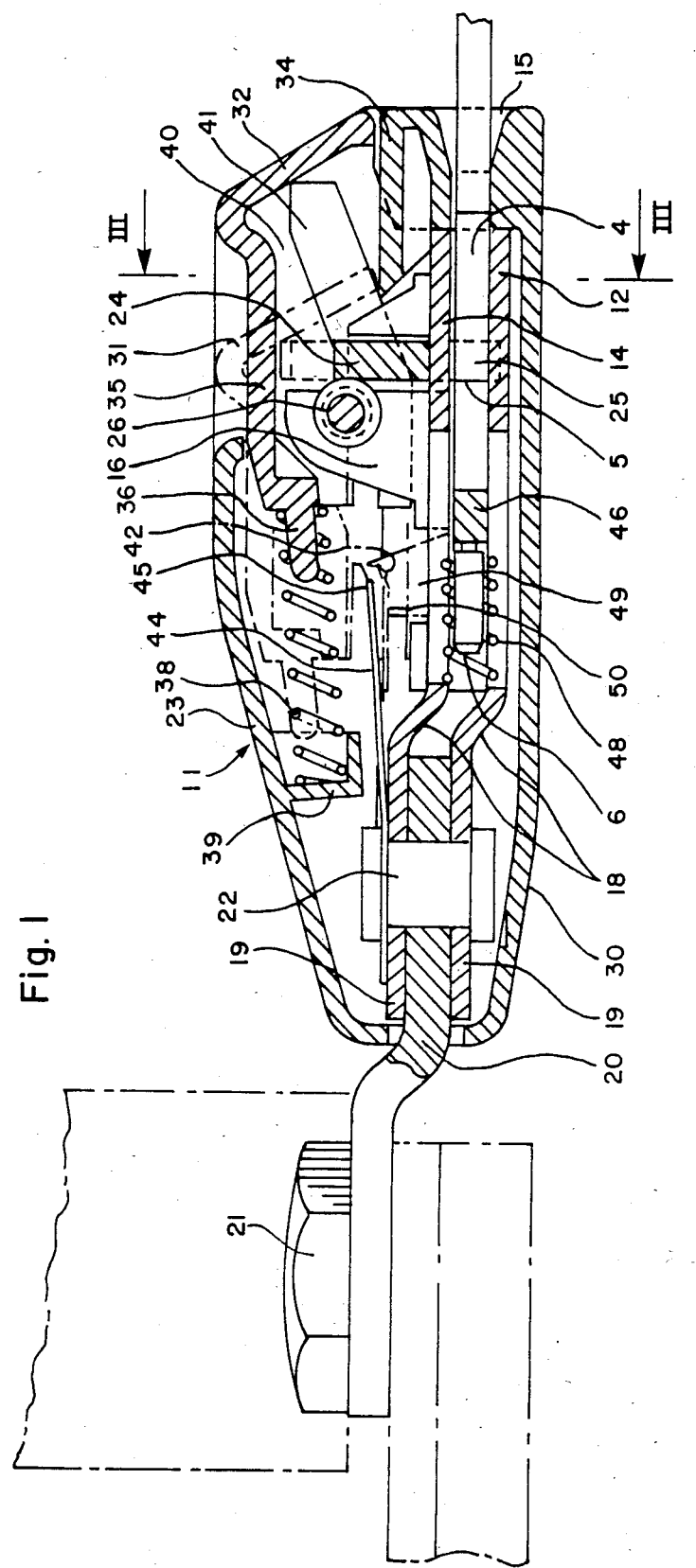
FIG. 1 is a sectional side view of a first buckle embodying the invention.

In the following description, directional terms such as "inwardly" and "rearwardly" refer to the direction of movement of the tongue part on insertion into the socket part of the buckle. Terms such as "upper" and "lower" refer to the illustrated buckles as they appear in the drawings. These terms are employed for convenience of description only, as the buckles of the invention can be employed in any orientation, and in seat belt systems of any configuration.

Figure 2:
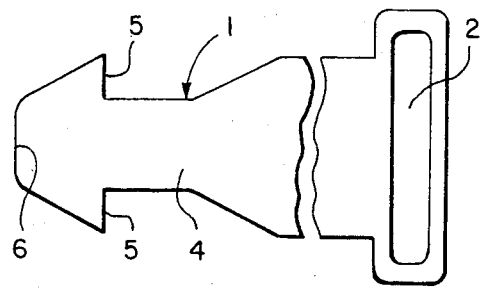
FIG. 2 is a plan view of a tongue part of the buckle.
Figure 3:
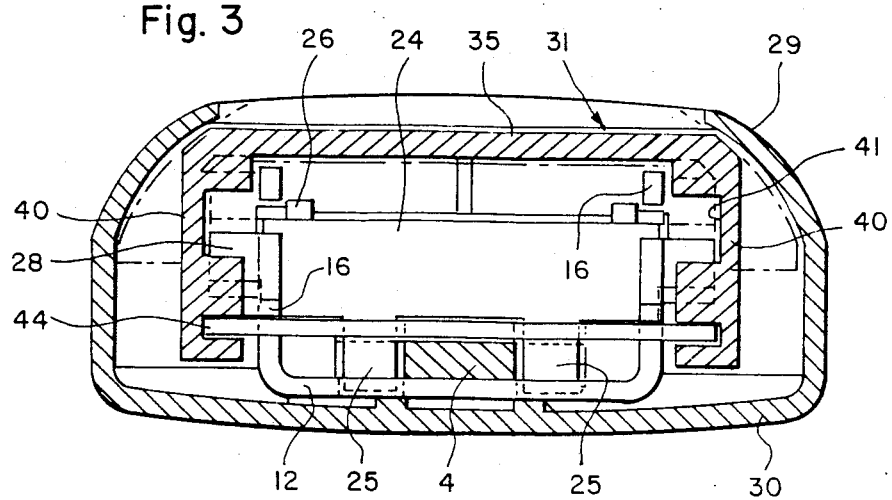
FIG. 3 is a sectional front view on the line III—III of FIG. 1.

The buckle illustrated in FIGS. 1 to 3 comprises a tongue part 1 and a socket part 11. As best seen from FIG. 2, the tongue part 1 is a flat elongate metal plate having at one end a transverse aperture 2 by which it can be connected to the belt of a vehicle seat belt system. From this end extends a tongue which tapers to a narrow neck 4 from which it broadens out on either side by means of transverse edges 5 which constitute latch formations by which the tongue can be retained in the socket of the socket part 11. Finally the tongue part converges to a rounded nose 6.

The socket part 11 comprises a frame constituted by a lower metal plate 12 and an upper metal plate 14 held in spaced parallel relationship to define between them a socket with an open end or mouth 15 through which the tongue of the tongue part 1 can be inserted into the socket and withdrawn from it. The upper and lower socket plates are held together by upwardly extending side portions 16 of the lower plate 12 by which this is keyed to the upper plate 14. The socket plates extend rearwardly from the mouth 15 beyond the socket, through double bend portions 18 to securement end portions 19 where they receive between them a metal bracket 20 which extends further rearwardly to provide a means whereby the socket part 11 can be anchored to a vehicle, as by a bolt, of which the head 21 is shown in FIG. 1, extending through an aperture in the bracket 20. The securement end portions of the upper and lower plates 12, 14 are held together by a rivet 22 or other suitable fastening means extending through aligned apertures in them and in the bracket 20. The socket part can be readily modified for securement to a vehicle mounting position by means other than a metal bracket, for example, a "dead" or a resilient cable or a short portion of belt.

Accommodated within the socket part 11 is a latch member or plate 24 guided so as to slide vertically, and thus at right angles to the direction of movement of the tongue into and out of the socket, between the latching position shown and a release position indicated in broken lines. The latch plate 24 is generally rectangular when viewed from the front except for two downwardly extending rectangular latch portions 25 and two lugs 28 extending laterally at the top. In the latching position, the portions 25 extend through an aperture in the upper plate 14 and span across the socket into an aperture in the lower plate 12. When the tongue is fully inserted into the socket, its edges 5 are positioned inwardly of the latch portions 25, which straddle the neck portion 4 of the tongue. Withdrawal forces acting on the tongue are applied by the edges 5 to the rear faces of the latch portions 25 which are supported, at positions directly ajdacent the engagement positions of the edges 5, by abutment against the rearward faces of the apertures in the plates 12,14 so the withdrawal forces are transferred to the socket part and thus to the vehicle mounting position in the direct and extremely strong manner.

The upwardly extending side portions 16 of the plate 12 extend beyond the upper plate 14 to provide support means for the latch plate at a position spaced from the socket. Although a fixed support means could be provided, the portions 16 journal a transversely extending guide roller 26 which bears against the rear face of the latch plate 24 and ensures that the latch plate is kept at right angles to the planes of the two socket plates when loaded by withdrawal forces acting on the tongue part 1, so enhancing the strength of the latching connection between the buckle parts.

The upper and lower plates 12, 14 are fixedly received in a housing comprising upper and lower housing parts 29, 30 moulded in plastics material and welded together. The housing parts are shaped to co-operate with the forward end of the socket plates to define the mouth 15 of the socket, and the upper housing part 29 has an opening extending rearwardly from the forward end of the upper socket plate. This opening accommodates a puch or release button 31 which can be slid manually in the rearward direction to effect release of the tongue from the socket. The release button comprises a front wall 32 which inclines rearwardly and upwardly from the socket mouth. The free end of the wall 32 slides along an upwardly and rearwardly turned portion 34 of the upper housing part 29. A top wall 35 extends rearwardly from the front wall 32 to beneath the transverse edge of the opening in the upper housing part 29. The inclination of the front wall 32 of the release button minimises the risk of inadvertent actuation of the button to cause the tongue to be released from the socket.

Beneath the upper housing part 29, the release button 31 is provided with a rearwardly projecting stub 36 received in one end of a compression return spring 38 having its other end received in a pocket 39 formed on the inner side of the upper housing wall. The spring 38 thus acts between the release button 31 and the upper housing part 29 to urge the release button to the position shown which is defined by suitable stop means (not shown).

Side walls 40 extend downwardly from the top wall 35 and rearwardly from the front wall 32 making the release button a hollow, channel-shaped member. Along the lower edges of the side walls 40, slots extend in thickened internally projecting portions of the walls, into which the free edges of the upper plates 14 are slidably received to guide the button 31 for movement parallel to the movement of the tongue in the socket.

Between the top wall 35 and its lower edge, each of the side walls 40 is provided with a groove or guide slot 41 providing a ramp surface which extends downwardly and rearwardly from a position in the front wall 32. In these guide slots 41 are received lugs 28 projecting laterally from the latch plate 24. Rearward movement of the release button 31 causes the latch plate 24 to slide upwardly, the release button eventually reaching a position of maximum compression of the return spring 38 in which the latch portions 25 are clear of the socket, permitting insertion and withdrawal of the tongue. Return movement of the release button 31 moves the latch plate 24 back into the latching position illustrated. The release button 31 will be seen to enclose the latch plate 24, to ensure that this cannot be inadvertently released in use by internal forces such as might be experienced during an accident to a vehicle in which the buckle is installed.

The side walls 40 each have a rearwardly extending portion providing an upwardly facing surface provided with a transversely extending L-shaped recess 42. A leaf spring 44 secured between the rivet head and the upper surface of the upper socket plate 14 extends forwardly and carries at its free end a transversely extending catch member 45 which is L-shaped in cross section, to match the cross section of the recesses 42. As the release button 31 is moved rearwardly into the housing, the ends of the catch member 45 slide on the release button side walls until they are urged by the leaf spring into the recesses 42. The release button is thus held against the forward movement urged by the now compressed return spring 38.

Slidably guided between the upper and lower socket plates 12, 14, is an ejector bar 46 which extends transversely across the socket for engagement by the nose 6 of the tongue. An ejector spring 48 acts between forward facing surfaces of apertures in the upper and lower socket plates and the rear face of the ejector bar 46, so as to urge this forwardly out of the mouth. On insertion of the tongue into the socket, the ejector bar 46 is pushed inwardly by the nose 6, compressing the ejector spring 48. When the tongue is released, by movement of the latch plate 24 upwardly to withdraw the latch portions 25 from the socket, the ejector spring 48 urges the bar 46 forward to expel the tongue from the socket. The ejector bar 46 has a guide portion 49 extending upwardly through an aperture in the plate 14 and having a rearwardly facing guide surface 50 for engaging the centre portion of the catch member 45 in the rearward position of the bar, so as to lift the member out of the recesses 42, against the leaf spring 44.

The operation of the buckle is now described. From the illustrated position in which the tongue is latched within the socket, the tongue is released by manual pressure on the release button 31. The lugs 28 of the latch plate 24 are guided by the cam slots 41 in the release button side walls 40 to raise the latch plate 24. At a predetermined rearward position of the release button 31, the latch portions 25 of the latch plate clear the edges 5 of the tongue, so that this is expelled from the socket by the ejector bar 46, powered by the energy stored in the ejector spring 48. The catch member 45 has then entered the L-shaped recesses 42 so the release button 31 is retained by the catch member in its inner or release position as long as the buckle remains out of use.

When the buckle comes again into use, the user inserts the tongue into the socket so that the nose 6 engages the ejector bar 46 and pushes this inwardly against the ejector spring 48. The ejector bar guide portion 49 is moved rearwardly, and its guide surface raises the catch member 45 out of the recesses 42 of the release button 31. The release button is then free to be moved forwardly to the position shown, by the return spring 38. This movement is necessarily accompanied by downward movement of the latch plate 24, so that the tongue is firmly held within the socket by the latch portions 25. In the forward position, the button overlaps or shrouds the latch plate against lateral release.

As the latch plate is held in a position withdrawn from the socket during insertion of the tongue, there is no transverse loading of the tongue during insertion. The only resistance to insertion comes from the action of the ejector spring on the ejector bar, precisely in the direction in which the tongue is being inserted.

The modified buckle illustrated in FIGS. 4 to 7 has a tongue part corresponding to the tongue part 1 of FIG. 2 and a socket part including lower and upper frame plates, housing parts and a release button corresponding generally to those of the socket part of FIGS. 1 and 3. These components are identified by the reference numerals used in FIGS. 1 and 3 and their nature and function are described below only so far as the differences between the modified buckle and that of FIGS. 1 to 3 makes this necessary.

The ejector bar 46 of the second buckle slides between the socket plates 12,14 with the spring 48 urging it forwardly, but has the guide portion 49 omitted. The ejector bar 46 has a concave front edge 51 shaped to receive the nose 6 of the tongue, and a pin 52 extending rearwardly to receive the spring 48. The bar has rearwardly facing steps 54 at its sides and a projection 55 underneath, by which the bar is guided in a longitudinally extending slot in the socket frame plate 12.

In the release position shown, the bar 46 underlies the latch portion 25 so the latch plate 24 cannot descend to the latching position, with forward movement of the button 31, under the force of spring 38, until the ejector, functioning as an anti-locking member, is moved inwardly by insertion of the tongue into the socket, when latching takes place. Movement of the button 31 inwardly raises the latch plate 24, allowing the ejector bar to move forwardly to eject the tongue and to prevent return to the latching position. The ejector bar thus functions as anti-latching means.

Although the buckle as so far described functions satisfactorily, it is preferred, to render false latching virtually impossible, to include as shown a special anti-latching member, or secondary ejector, which co-operates with the ejector bar to act as a tandem ejector system.

The anti-latching member 60 has a transversely-extending portion with forwardly-extending portions 61 at its sides spaced apart for reception beneath the lugs 28 of the latch plate 24. A central rearwardly-extending pin 62 is received in one end of a compression spring 64 the other end of which is trapped in a retainer secured to the socket frame. The anti-latching member 60 has at each side a downwardly and inwardly extending portion 66 by which it is slidingly guided on the upper plate 14.

In the release position of the socket part shown in FIG. 4, the ejector bar 46 is urged by the spring 48 into its forward position defined by engagement with the parts of the cover around the socket mouth. The anti-latching member 60 is likewise urged forward by the spring 64 and the portions 61 are received between the lugs 25 and the upper socket plate 14 to hold the latch plate in a non-latching, position, with the push button 31 in its rearward or release position.

On insertion of the tongue, the nose 6 engages the ejector bar 46 and moves this rearwardly. After a certain rearward movement, the shoulders 54 engage the portions 66 of the anti-latching member 60 so that as the bar 46 is moved further inwardly the member 60 is carried rearwardly also. This movement continues until the portions 61 are withdrawn from beneath the lugs 28 so releasing the push button and the latch plate for return to the latching position. By this time the latch edges 5 of the tongue are beyond of the aligned apertues in the plates 12,14 through which the latch plate portions now extend. The two buckle parts are thus securely latched together.

On inward movement of the push button 31, the latch plate 24 is raised until the tongue edges 5 are cleared. The ejector bar 46 moves outwardly together with the anti-latching member 60 to expel the tongue. Both springs 48 and 64 are involved in this movement until the member 60 abuts the latch plate, the projections 61 being then under the lugs 28. The ejector bar completes the foward movement under the force of the spring 48 alone.

The side portions 16 of the socket frame plate 12 are formed with rear and front guide legs 72,74 between which the latch plate slides. A roller could be supported on the legs 72 but instead a rounded projection 71 is formed at the top of each of these legs to reduce friction between these legs and the latch plate.

Figure 8:
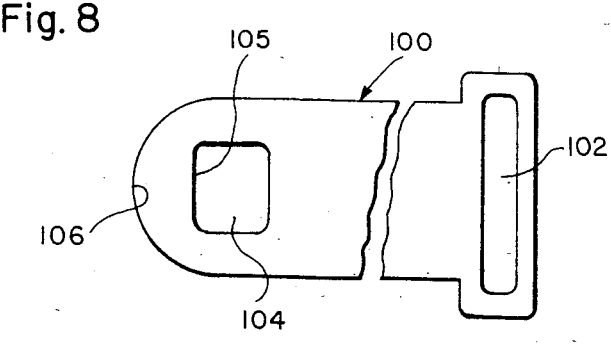
FIG. 8 is a plan view of a modified form of the tongue part.

As shown in FIG. 8, a modified tongue part 100 can comprise a flat metal plate with a different kind of latch formation from that of the tongue 1 of FIG. 2. The modified tongue part 100 again has a belt connection aperture 102 at one end and a rounded nose 106 at the other, but only a single latching edge 105 is provided, by means of a central aperture 104 in the tongue. It will be evident that the socket parts of the buckles illustrated can be readily modified to receive this tongue part, by providing the latch member with a single central latch portion instead of the two transversely spaced latch portions.

The invention has been particularly shown and described with reference to particular embodiments thereof, but it will be understood by those skilled in the art that various changes and modifications may be made therein without departing from the spirit and scope of the invention.

We claim:

1. A buckle for use in a vehicle seat belt system comprising tongue means and cooperating socket means;

said tongue means having a tongue and a latch formation on the tongue, and said socket means having means providing a socket for receiving said tongue therein, latch means having a latching position extending into said socket for engagement with said latch formation to latch said tongue within said socket, said latch means being movable from said latching position to a release position out of engagement with said latch formation to permit said tongue to enter and leave said socket, first spring means urging said latch means to said latching position thereof, ejector means slidably received in said socket and engageable by said tongue on entry into said socket, second spring means acting on said ejector means to oppose movement thereof with said tongue on entry thereof into said socket and to thereby provide a force for ejection of said tongue from said socket, antilatching means movable to a condition retaining said latch means in said release position thereof on movement of the latch means to said release position thereof, and means on said ejector means engageable with said antilatching means on movement of said ejector means with said tongue on entry thereof into said socket to move said antilatching means to a second condition permitting movement of said latch means by said first spring means to said latching position to latch said tongue within said socket.

2. The buckle of claim 1 wherein said antilatching means when releasably retaining said latch means is received between said latch means and said socket means.

3. The buckle of claim 2 wherein said antilatching means is slidably guided on said socket means for movement substantially parallel to said movement of said tongue into and out of said socket.

4. The buckle of claim 3 wherein said latch means has edge means thereon externally of said socket and said anti-latching means is receivable between said edge means and said socket means.

5. The buckle of claim 1 wherein said ejector means in absence of said tongue from said socket occupies a position blocking said latch means from movement to said latching position thereof.

6. The buckle of claim 5 wherein said means of said ejector means engages said antilatching means after movement of said ejector means with said tongue on entry thereof into said socket sufficient to unblock said latch means for movement to said latching position thereof.

7. The buckle of claim 1 further comprising release means carried by said socket means for sliding movement substantially parallel to the direction of movement of said tongue into and out of said socket, and pin and slot means connecting together said release means and said latch means so that said release means can be manually moved to effect movement of said latch means from said latching to said release position thereof.

8. The buckle of claim 7 wherein said first spring means acts between said release means and said socket means.

9. The buckle of claim 7 wherein said antilatching means comprises catch means engageable with said release means on said manual movement thereof.

10. A buckle for use in a vehicle seat belt system comprising tongue means and cooperating socket means; said tongue means having a tongue and a latch formation on the tongue, and said socket means having means providing a socket for receiving said tongue therein, latch means having a latching position extending into said socket for engagement with said latch formation to retain said tongue within said socket and a release position out of engagement with said latch formation to permit said tongue to enter and leave said socket, first guide means guiding said latch means for movement between said latching and said release positions in a direction transverse to the direction of movement of said tongue into and out of said socket, manually movable release means, second guide means guiding said release means for movement in a direction substantially parallel to said direction of movement of said tongue into and out of said socket, pin and slot means operatively linking said latch means and said release means for movement thereof together, spring means urging said latch means to said latching position thereof, and anti-latching means adapted to retain said latch means in said release position thereof in absence of said tongue from said socket and to permit restoration of said latch means to said latching position in response to entry of said tongue into said socket, whereby said release means is held in the position thereof corresponding to said release position of said latch means in absence of said tongue from said socket.

11. The buckle of claim 10 wherein said antilatching means comprises catch means adapted to engage said release means on movement of said latch means to said release position thereof and means movable in said socket by said tongue to release said catch means on insertion of said tongue into said socket.

12. The buckle of claim 11 having second spring means urging said means movable in said socket to oppose said entry of said tongue whereby said movable means functions as an ejector mens to eject said tongue on movement of said latch means to said release position thereof.

13. The buckle of claim 12 wherein a detent recess is formed in said release means and wherein said catch means comprises a detent member, and spring means adapted to urge said detent member into said detent recess, said ejector means having means projecting outwardly of said socket to remove said detent member from said recess on insertion of said tongue into said socket.

14. The buckle of claim 10 wherein said antilatching means comprises an ejector member engageable by said tongue for sliding thereiwth on insertion thereof into said socket and spring means biassing said ejector member to oppose said tongue, said ejector member being adapted to engage said latch means to hold the latch means out of the latching position on operation of said release means.

15. The buckle of claim 14 wherein said socket providing means has aperture means through which said latch means extends in the latching position thereof, said ejector member being adapted to block said aperture means to hold said latch means out of said latching position thereof.

16. The buckle of claim 14 wherein said ejector means comprises first means slidable in said socket and second means slidable externally of said socket, said second means being adapted to engage said latch means.

17. A vehicle seat belt buckle comprising a tongue part and a socket part,
said tongue part having a tongue provided with a latch formation, and
said socket part having:
means defining a socket within which said tongue can be received,
a latch member having a guide portion and a latch portion, said latch member being non-rotationally movable between a latching position wherein said latch portion is within said socket to engage said latch formation to retain said tongue in said socket and a release position wherein said latch portion cannot engage said latch formation whereby said tongue can enter and leave said socket,
release means manually operable to effect movement of said latch means from said latching to said release position, and
support means fixedly located in said socket part, said support means engaging said latch member guide portion in said latching position of said latch member at a position spaced away from said socket to support said latch means against forces tending to withdraw said tongue from said socket.

18. The buckle of claim 17 wherein said support means comprises roller means.

19. The buckle of claim 18 wherein said socket is defined by two plate members having spaced apart parallel portions, one of said plate members having side portions perpendicular to said parallel portions and mounting said roller means.

20. The buckle of claim 17 wherein said support means providing edge means extending substantially parallel to the direction of movement of said latch means and having projection means thereon for engaging said latch means over a limited area.

21. The buckle of claim 20 wherein said projection means is formed at the edge of a slot in said support means within which slot said latch means moves.

22. The buckle of claim 20 wherein said support means is constituted by side portions of a plate member having an intermediate portion joining and perpendicular to said side portions, said intermediate portion defining one boundary of said socket.

23. A buckle for use in a vehicle seat belt system and comprising tongue means and cooperating socket means;
said tongue means comprising a tongue and latch formation means on said tongue, and
said socket means comprising a socket for receiving said tongue therein,
a latch member having a guide portion and a latch portion, said latch member being movable between a latching position in which said latch portion extends into said socket for engagement with said latch formation means when said tongue is received within said socket, to thereby latch said tongue to said socket, and a release position in which said latch portion is positioned to allow movement of said tongue into and out of said socket,
a release member manually movable to effect movement of said latch member from said latching position to said release position thereof, said release member having a center wall and side walls extending therefrom, said center wall overlying said latch member with said guide portion between said center wall and said socket and said side walls flanking said latch member, whereby said release member substantially encloses said latch member.

24. The buckle of claim 23 wherein said release member is movable in the direction of movement of said tongue into and out of said socket and wherein said side walls are slidably guided on said socket means.

25. The buckle of claim 24 wherein said socket means comprises two spaced parallel plates defining said socket therebetween, one of said plates projecting transversely of said socket on either side to slidably guide said channel member side walls.

26. The buckle of claim 25 wherein the plate of said parallel plates remote from said center wall has side portions extending towards said center wall and connected to the other of said plates, said other of said plates projecting transversely of said socket to guide said release means.

27. The buckle of claim 23 wherein said side walls have formations on the inner surfaces thereof whereby said release means is coupled to said latch means.

28. The buckle of claim 27 wherein said formations comprise grooves inclined to the direction of sliding movement of said release means, and wherein said latch means is slidably guided for movement transverse to the movement of the tongue into and out of the socket and has a lateral projection on either side received in a respective one of said grooves.

29. The buckle of claim 28 further comprising anti-latching means adapted to retain said latch means in said release position thereof during absence of the tongue from said socket and to permit movement of said latch means to said latching position on entry of said tongue into said socket.

30. The buckle of claim 23 wherein said release members has a manually engageable end wall, said end wall being inclined away from the direction of movement of said tongue into said socket.

31. A vehicle seat belt buckle comprising a tongue part and a socket part,
said tongue part having a tongue provided with a latch formation, and
said socket part having:
means defining a socket within which said tongue can be received,
latch means, said latch means being movable between a latching position wherein said latch means engages said latch formation to retain said tongue in said socket and a release position wherein said latch means is disengaged from said latch formation to permit said tongue to enter and leave said socket, and
release means, said release means being manually operable to effect movement of said latch means from said latching to said release position, said socket defining means comprising two plate means space depart to define said socket therebetween, one of said plate means having edge portions projecting outwardly of said socket, and said release means having opposed side portions and grooves in said side portions slidably receiving said outwardly projecting plate edge portions, whereby said release is slidably guided by said socket defining means.

32. The buckle of claim 31 wherein said other of said plate means has side web portions extending towards said one plate means, said plate means being connected together at the junction of said side web portions and said one plate means.

33. The buckle of claim 31 wherein said release means is hollow so as to have an interior and said interior substantially encloses said latch means therein when said tongue is latched within said socket.

34. The buckle of claim 31 wherein said release means has a manually engageable end wall means inclined away from the direction of movement of said tongue into said socket.

35. The buckle of claim 31 wherein said release means is channel shaped so as to have opposed side walls, said side walls being slidably guided on said plate means.

36. The buckle of claim 35 wherein said release means side walls have formations on the inner surfaces thereof whereby said release means is coupled to said latch means.

37. The buckle of claim 36 wherein said formations comprise ramp means inclined to the direction of sliding movement of said release means, and said latch means has a lateral projection on either side thereof engaging on a respective one of said ramp means.

38. A vehicle seat belt buckle comprising of tongue part and a socket part, the tongue part having a tongue with a latch formation, and the socket part having means defining a socket for receiving the tongue, a latch member having a latching position in which the latch member engages the latch formation when the tongue is in the socket to thereby latch the buckle parts together and being movable from the latching position to allow the tongue to be withdrawn from the socket, an ejector member engageable by said tongue on insertion thereof into said socket, first biassing means applying to said ejector member a bias opposing movement of said ejector member into said socket, a secondary ejector element slidable parallel to said ejector member and engageable by said ejector member for movement therewith in the direction of tongue movement into said socket after a predetermined movement of said ejector member in said direction, and second biassing means opposing said movement of said secondary ejector element.

39. The buckle of claim 38 wherein said secondary ejector element is located to engage said latch member to prevent movement of said latch member to said latching position thereof until moved by said ejector member, against said second biassing means.

* * * * *